US012719629B2

(12) United States Patent
Capkevics et al.

(10) Patent No.: US 12,719,629 B2
(45) Date of Patent: Aug. 25, 2026

(54) DATA COMMUNICATION APPARATUS AND METHOD

(71) Applicant: Arm Limited, Cambridge (GB)

(72) Inventors: Haralds Capkevics, Cambridge (GB); Timothy Nicholas Hay, Cambridge (GB)

(73) Assignee: Arm Limited, Cambridge (GB)

( * ) Notice: Subject to any disclaimer, the term of this patent is extended or adjusted under 35 U.S.C. 154(b) by 382 days.

(21) Appl. No.: 18/459,625

(22) Filed: Sep. 1, 2023

(65) Prior Publication Data

US 2024/0089042 A1 Mar. 14, 2024

(30) Foreign Application Priority Data

Sep. 8, 2022 (GB) ..................................... 2213143

(51) Int. Cl.
*H04L 5/00* (2006.01)
*H04L 49/90* (2022.01)

(52) U.S. Cl.
CPC ............ *H04L 5/0044* (2013.01); *H04L 49/90* (2013.01)

(58) Field of Classification Search
CPC ... H04L 5/00; H04L 1/18; H04L 49/90; H04L 41/06; H04L 47/34; H04L 47/43; H04L 67/14; H04L 69/00; H04L 69/03; H04L 69/32; G06F 13/42; G06F 13/22; G06F 13/32; G06F 13/38; G06F 9/54; G06F 15/16; G06F 15/17; G06F 11/10; G06F 1/32; G06F 1/28

(Continued)

(56) References Cited

U.S. PATENT DOCUMENTS 6,209,023 B1 * 3/2001 Dimitroff ................ G06F 3/067 719/326
8,156,296 B2 * 4/2012 Nguyen ................ G06F 3/0659 709/225

(Continued)

FOREIGN PATENT DOCUMENTS

JP 2002182798 A 6/2002

OTHER PUBLICATIONS

Combined Search and Examination Report for Great Britain application No. GB2213143.7, dated Mar. 3, 2023.

*Primary Examiner* — Man U Phan
(74) *Attorney, Agent, or Firm* — NIXON & VANDERHYE P.C.

(57) ABSTRACT

Data communication apparatus comprises a receiver comprising message receiver circuitry to receive payload messages and sender control messages from message sender circuitry, the message receiver circuitry comprising: communication circuitry to send receiver control messages to the message sender circuitry, the receiver control messages relating to actions by the message receiver circuitry in response to payload messages or sender control messages from the message sender circuitry; in which the communication circuitry is configured to selectively associate a respective indication with at least some of the receiver control messages sent to the message sender circuitry, the indication indicating whether a given receiver control message with which the indication is associated is a first receiver control message sent by the communication circuitry to the message sender circuitry after a reset of circuitry in the receiver.

19 Claims, 7 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 8,170,929 | B1 * | 5/2012 | Mallon | G06Q 10/0875 705/29 |
| 8,458,267 | B2 * | 6/2013 | Chen | G06F 11/348 709/206 |
| 9,176,912 | B2 * | 11/2015 | Perry | G06F 13/385 |
| 10,050,924 | B2 * | 8/2018 | Rohnert | H04L 51/224 |
| 10,948,963 | B2 * | 3/2021 | Paterson | G06F 1/28 |
| 11,809,258 | B2 * | 11/2023 | Garg | G06F 1/325 |
| 2004/0136365 | A1 * | 7/2004 | Eltschka | H04Q 3/60 370/374 |
| 2008/0028174 | A1 | 1/2008 | Nguyen et al. | |
| 2010/0250684 | A1 * | 9/2010 | Naish | H04L 67/60 709/201 |
| 2012/0236797 | A1 * | 9/2012 | Lindholm | H04W 76/16 370/328 |
| 2023/0019132 | A1 * | 1/2023 | Severino | H04L 47/34 |
| 2023/0042583 | A1 * | 2/2023 | Novo Diaz | H04L 1/1848 |

* cited by examiner

DATA COMMUNICATION APPARATUS AND METHOD

BACKGROUND

This disclosure relates to data communication apparatus and methods.

It is known to provide communication Interface circuitry. sometimes known as a message handling unit (MHU) to provide or facilitate data communication across different so-called "domains" such as power, clock and/or reset domains. Typically an MHU provides circuitry configured to interface with each respective domain and to provide a bridge between the different domains.

It is in the context of this type arrangement that the present disclosure arises.

SUMMARY

In an example arrangement there is provided circuitry comprising:

a receiver comprising message receiver circuitry to receive payload messages and sender control messages from message sender circuitry, the message receiver circuitry comprising:

communication circuitry to send receiver control messages to the message sender circuitry, the receiver control messages relating to actions by the message receiver circuitry in response to payload messages or sender control messages from the message sender circuitry;

in which the communication circuitry is configured to selectively associate a respective indication with at least some of the receiver control messages sent to the message sender circuitry, the indication indicating whether a given receiver control message with which the indication is associated is a first receiver control message sent by the communication circuitry to the message sender circuitry after a reset of circuitry in the receiver.

In another example arrangement there is provided circuitry comprising:

message sender circuitry to send payload messages and sender control messages to message receiver circuitry of a receiver and to receive receiver control messages from the message receiver circuitry, the message sender circuitry comprising:

control circuitry to detect an indication, associated with a given receiver control message received from the message receiver circuitry, the indication indicating whether the given receiver control message is a first receiver control message sent by the message receiver circuitry to the message sender circuitry after a reset of circuitry in the receiver.

In another example arrangement there is provided a method comprising:

message receiver circuitry of a receiver receiving payload messages and sender control messages from message sender circuitry; and sending receiver control messages to the message sender circuitry, the receiver control messages relating to actions by the message receiver circuitry in response to payload messages or sender control messages from the message sender circuitry;

in which the sending step comprises selectively associate a respective indication with at least some of the receiver control messages sent to the message sender circuitry, the indication indicating whether a given receiver control message with which the indication is associated is a first receiver control message sent by the communication circuitry to the message sender circuitry after a reset of circuitry in the receiver.

In another example arrangement there is provided

In another example arrangement there is provided a method comprising:

sending payload messages and sender control messages to message receiver circuitry of a receiver;

receiving receiver control messages from the message receiver circuitry; and detecting an indication, associated with a given receiver control message received from the message receiver circuitry, the indication indicating whether the given receiver control message is a first receiver control message sent by the message receiver circuitry to the message sender circuitry after a reset of circuitry in the receiver.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
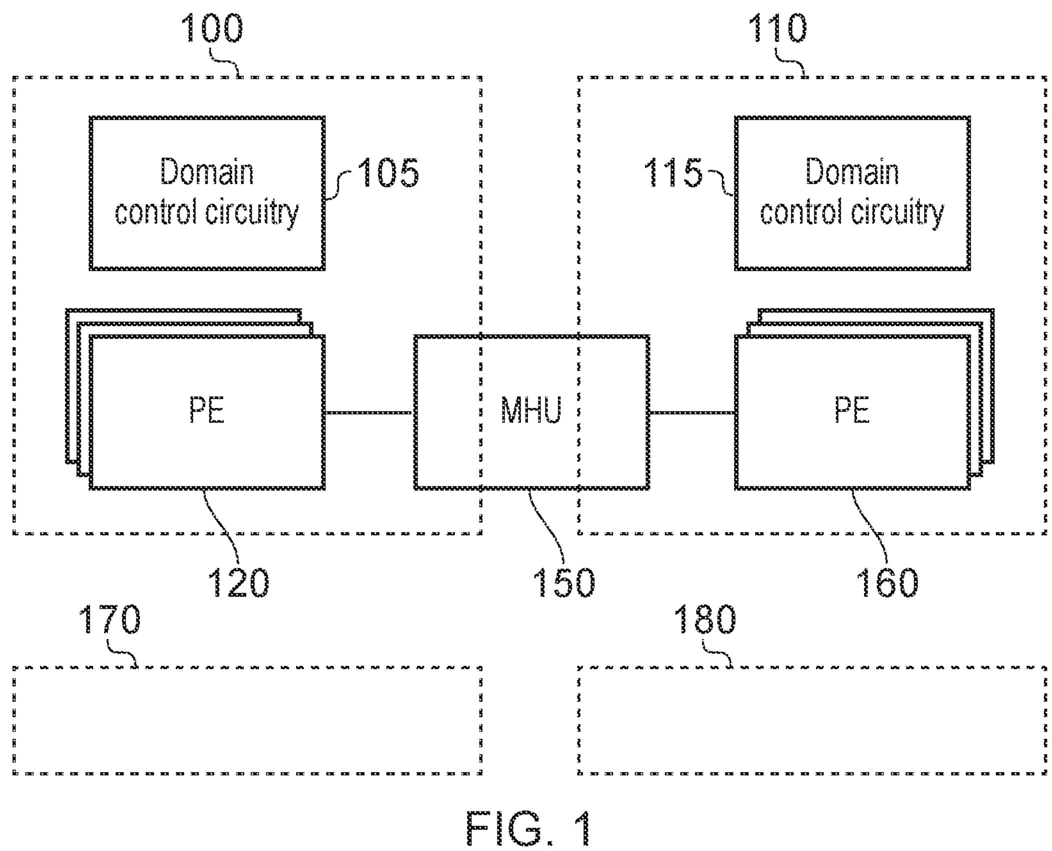
FIG. 1 schematically illustrates an example data processing apparatus.

Referring now to the drawings, FIG. 1 schematically illustrates an example data processing apparatus in which one or more processing elements (PEs) 120 in a first domain (for example, a power, clock and/or reset domain) communicate with one or more PEs in a second such domain 110 via a so-called message handling unit (MHU) 150. Each domain has respective domain control circuitry which controls the operation and/or resources applicable to that domain, so that the domain 100 and the domain 110 are therefore examples of first and second operational domains are configured to have a respective clock, power and/or reset resource removed or applied independently of the other of the first and second operational domains. For example, the domain control circuitry can initiate a reset operation in respect of at least a subset of circuitry in that domain. Similarly, an instance of the domain control circuitry can control at least a subset of the circuitry in that domain to enter a low power state or the like.

In fact, the domains 100, 110 may be provided as separate nodes of a network on chip (NoC) or system on chip (SoC) in which multiple respective nodes are interconnected together on a single integrated circuit substrate. To illustrate this type of arrangement in a schematic form, two further such nodes 170, 180 are illustrated in FIG. 1.

There may be a network, grid or other arrangement of many such nodes in an NoC or SoC, for example making use of so-called interconnect circuitry. The system may be connected to a main memory or other peripheral circuitry (not shown). Other aspects of communication—in particular message handling—between PEs of the respective domains 100, 110 will be discussed in some detail below.

The PEs 120 can communicate with the PEs 160 via the MHU 150. The MHU 150 facilitates communication between the different domains discussed above. In general terms the MHU 150 provides a (substantially) always operational shared payload message area which can be accessed by sending and receiving circuitry associated with the respective domains. Note that in FIG. 1, MHU circuitry 150 is shown only between two of the domains. It will be appreciated however that similar techniques may be used for communication between any pair of domains or nodes in the arrangement of FIG. 1, but that details are omitted relating to other pairs of nodes for clarity of the diagram. Similarly, in the discussion below, circuitry appropriate to unidirectional communication is described, but it will be appreciated that in practice a complimentary instance of such circuitry would be provided to allow for bidirectional communication between PEs of respective domains.

Figure 2:
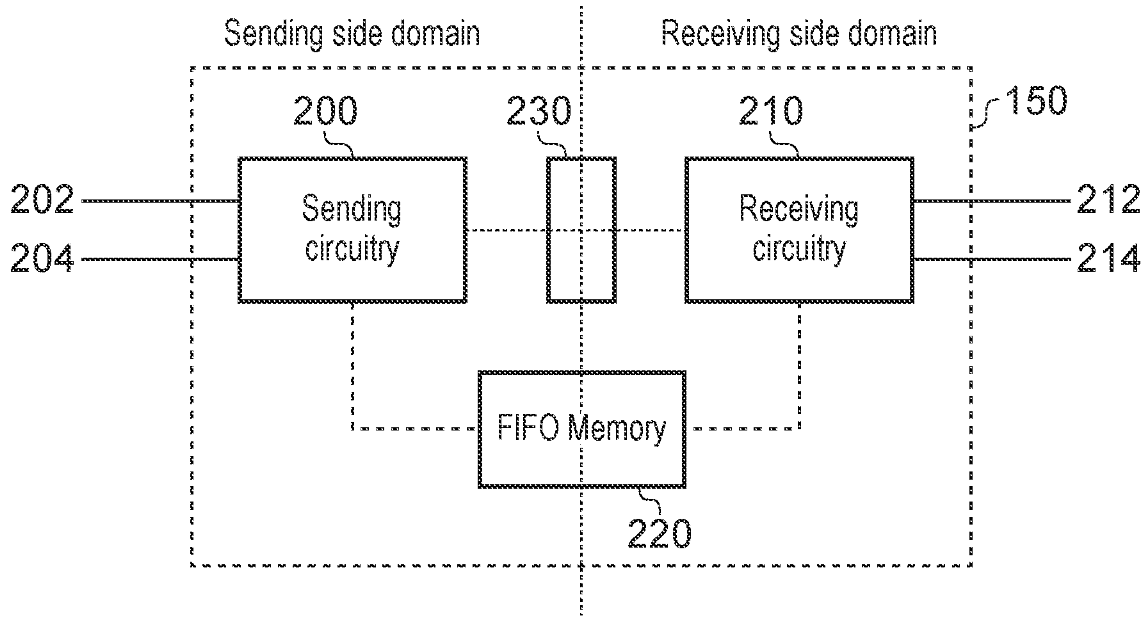
FIG. 2 schematically illustrates an overview of a message handling unit (MHU)

Referring now to FIG. 2, an example of the MHU 150 is shown, which as discussed schematically illustrates unidirectional communication (for example from a PE in the domain 100 to a PE in the domain 110). Sending circuitry 200 communicates with receiving circuitry 210 by way of so-called messages. A payload message can be communicated to the sending circuitry 200 by a relevant PE 120 by a data communication path 202. A signal or notification path 204 allows the originating (or upstream) PE 120 to provide a signal or notification (which in some implementations may be an interrupt) to the sending circuitry 200 to initiate further handling of the payload message by the MHU.

The receiving circuitry 210 has an associated data communication path 212 to allow data communication with a destination (or downstream) PE and also an interrupt path 214 to allow the receiving circuitry to issue an interrupt to the downstream circuitry to initiate retrieval of a payload message from the receiving circuitry.

A first-in-first-out (FIFO) memory 220 and domain bridge circuitry 230 are provided between the sending circuitry 200 and the receiving circuitry 220. In order for a payload message to be passed from the sending circuitry 200 to the receiving circuitry 210, the payload message is written to the FIFO memory 220 by the sending circuitry 200 and there is an exchange of control signals between the sending circuitry 200 and the receiving circuitry 210 via the domain bridge circuitry 230 so that the receiving circuitry is informed that the payload message is held by the FIFO memory 220. A further passing of control signals confirms that the payload message has been retrieved from the FIFO memory 220 by the receiving circuitry 210 for passing to downstream circuitry for further handling. Examples of such an exchange of control signals will be discussed below.

In other words, the FIFO memory is an example of buffer circuitry accessible by the downstream circuitry, to buffer payload messages received from the message sender circuitry.

Note however that the use of a FIFO memory is not a requirement, or at least that the data can be transferred from such a FIFO and be stored in storage of the receiver circuitry. In the context of an MHU, messages may be merged or overwritten in the receiver before reading (if multiple messages are received for a given channel).

Figure 3:
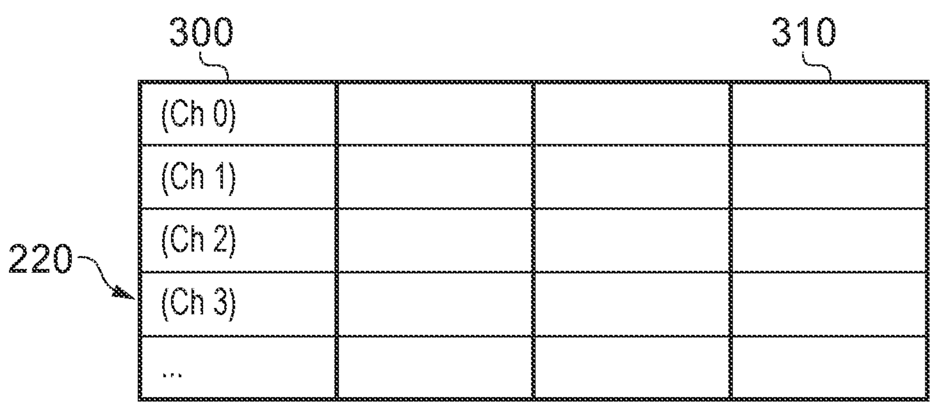
FIG. 3 schematically illustrates the use of multiple channels.

In examples which use a FIFO memory, the FIFO memory 220 may be arranged, as between the sending circuitry 200 and the receiving circuitry 210, as a plurality of so-called channels. This may be achieved, for example, by physically or logically partitioning the FIFO memory 220 into separate FIFO streams so that the first-in-first-out operation is applied separately to each respective channel. FIG. 3 schematically illustrates a set of such channels labelled 300 as (Ch n) where n is 0 to 3 . . . in the particular example of FIG. 3. Each channel is associated with plural storage locations 310 which are accessed by both the sending circuitry 200 and the receiving circuitry 210 in a FIFO manner.

As part of their operation, the sending circuitry can send payload messages and sender control messages to the receiving circuitry. The receiving circuitry can similarly send receiver control messages to the sending circuitry. Therefore, in the discussion of control messages in the description below, the prefix "sender" or "receiver" can be used or implied, depending on the polarity or direction of the relevant control message.

Figure 4A:
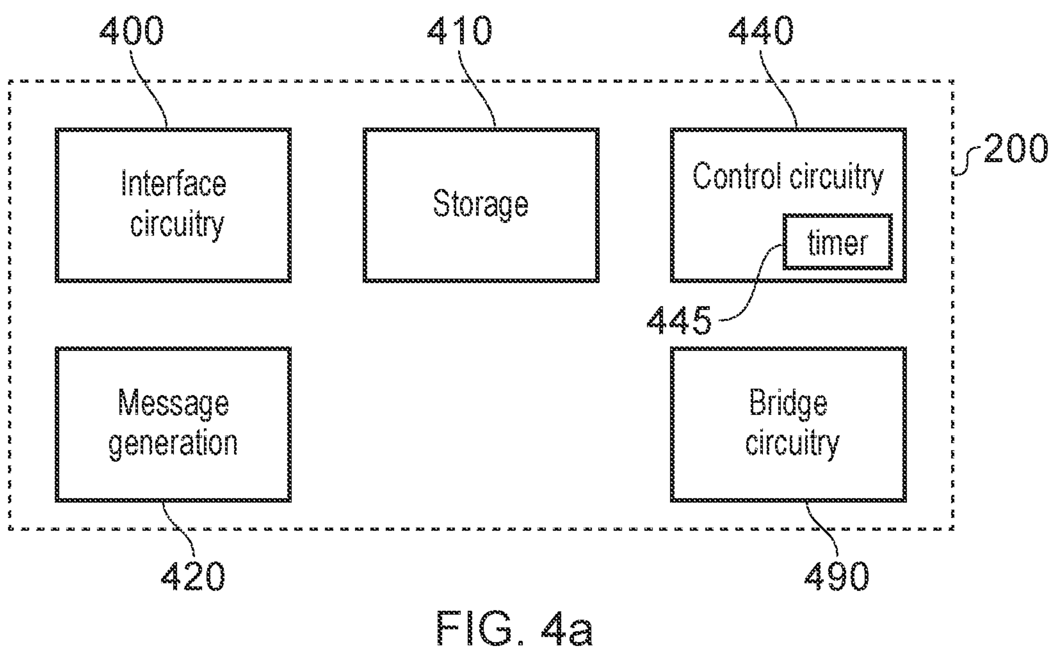
FIG. 4*a* schematically illustrates message sending circuitry.
Figure 4B:
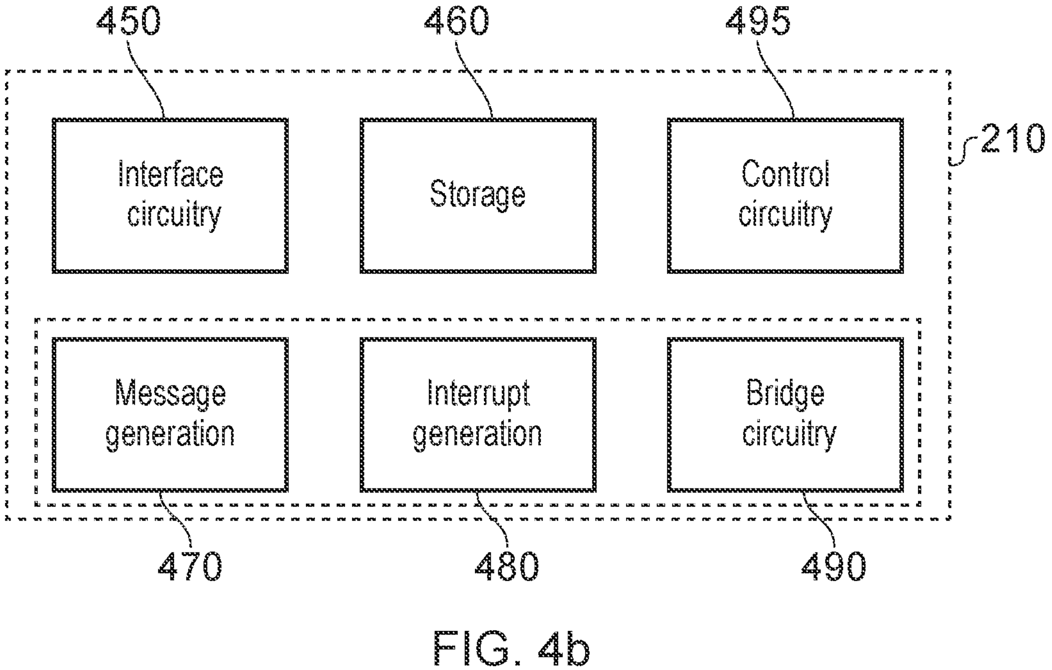
FIG. 4*b* schematically illustrates message receiving circuitry.

FIGS. 4*a* and 4*b* schematically illustrate aspects of the operation of the sending circuitry 200 and the receiving circuitry 210 respectively.

The sending circuitry 200 comprises interface circuitry 400 to handle the interfaces 202, 204 shown in FIG. 2; storage circuitry 410 such as registers, flip-flops or RAM to provide temporary storage of data to be communicated to the receiving circuitry; message generation circuitry 420 to format such data into one or more payload messages and to store such payload messages in the FIFO memory 220; bridge circuitry 430 to communicate control information with the receiving circuitry (and effectively forming a sending circuitry side of the domain bridge circuitry 230 discussed above); and control circuitry 440 to control operations of the sending circuitry 200. The control circuitry 440 may comprise timer circuitry 445 to handle a counter or timer to be discussed below.

The receiving circuitry 210 comprises interface circuitry 450 to handle the interfaces 212, 214 shown in FIG. 2; storage circuitry 460 to provide temporary storage of data being forwarded to downstream devices; message generation circuitry 470 to handle the generation of control messages to be sent to the message sending circuitry; interrupt generation circuitry 480 to generate an interrupt to be sent to downstream circuitry indicating the presence of a payload message to be retrieved; bridge circuitry 490 to communicate control information with the sending circuitry (and effectively forming a receiving circuitry side of the domain bridge circuitry 230 discussed above); and control circuitry 495 to control operations of the receiving circuitry 210.

The control circuitry 495 may for example control a reset of circuitry in the receiver, for example in response to a request or command from the respective domain control circuitry. Example control messages sent by the receiving circuitry to the sending circuitry may include one or more of (i) a message to acknowledge receipt of a payload message or a control message from the message sender circuitry and (ii) a message to acknowledge output of a payload message by the message receiver circuitry to downstream circuitry.

Figure 5:
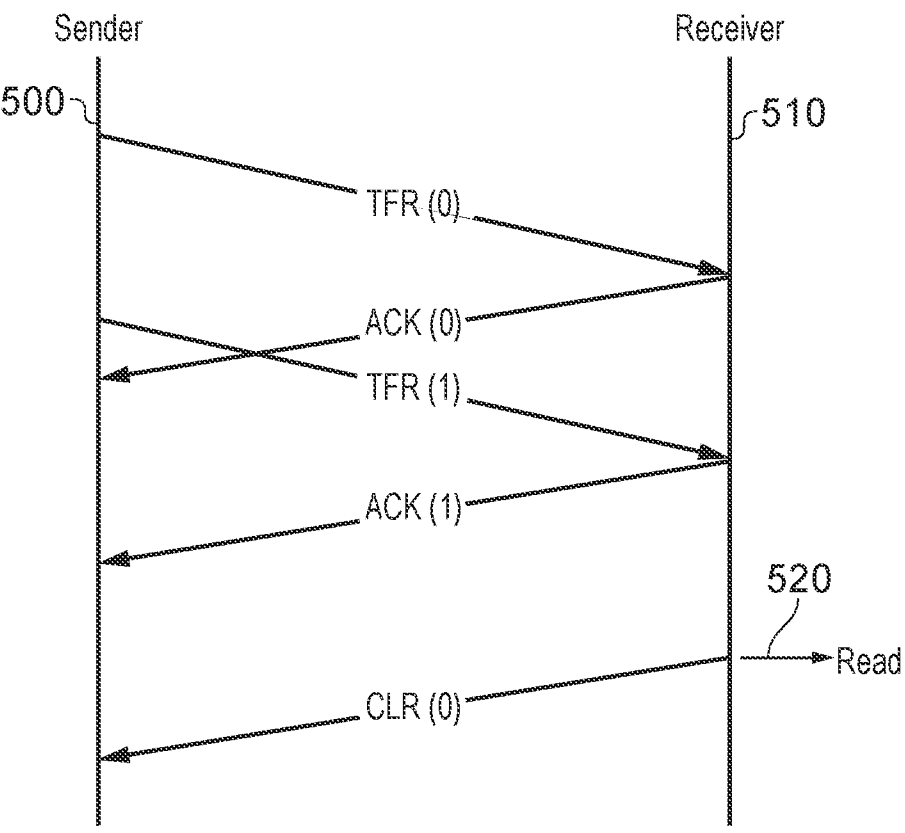
FIGS. 5 to 8 are schematic diagrams illustrating interactions between a message transmitter and a message receiver.

FIG. 5 is a schematic timing diagram illustrating basic operations of message communication as between the sending circuitry 200 and the receiving circuitry 210. Here, the sending circuitry is referred to as "sender" and communications by the sending circuitry are represented by arrows emanating from a left hand vertical line 500. The receiving circuitry is referred to as "receiver and communications by the receiving circuitry are represented by arrows emanating from a right-hand vertical line 510. Time is represented by a progression vertically downwards as drawn. A notation used in FIG. 5 and further diagrams to be described below is that a numeral in parentheses represents a channel number; for example, TFR(0) represents an operation with respect to channel 0 as discussed above with respect to FIG. 3.

In FIG. 5, a first example operation is shown as TFR(0) which represents the sending circuitry (a) writing a payload message to channel 0 of the FIFO memory and (b) sending a control message TFR to the receiving circuitry in order to indicate that the payload message has been written to the FIFO memory. The receiving circuitry sends an acknowledgement ACK(0) to indicate that the TFR control message has been noted at the receiving circuitry. However, the acknowledgement ACK(0) does not of itself indicate that the relevant payload message has been retrieved from the FIFO memory.

A similar pair of TFR(1) and ACK(1) are indicated relating to a payload message written to channel 1 of the FIFO memory by the sending circuitry. At this stage, there are two unread payload messages in the FIFO memory—one in each of channels 0 and 1.

Once the receiving circuitry has received a TFR control message and acknowledged it, the receiving circuitry can issue an interrupt to the relevant downstream circuitry to prompt the downstream circuitry to retrieve the payload message from the receiving circuitry, which in turn represents retrieving the payload message from the FIFO memory by the message handling circuitry 470. When that has taken place, shown schematically as a read operation 520 in the timeline of FIG. 5, the receiving circuitry issues a CLR control message to the sending circuitry. In the example of FIG. 5, a CLR(0) control message is shown indicating that the payload message of channel 0 has been read.

Therefore, at the end (bottom of the drawing as presented) of the process of FIG. 5, message processing has been completed for the example payload message in channel 0. The example payload message in channel 1 remains outstanding in the FIFO memory awaiting a read operation at the receiving circuitry side and the issue of a CLR(1) control message.

TFR is an example of a sender control message. ACK and CLR are examples of receiver control messages.

Figure 6:
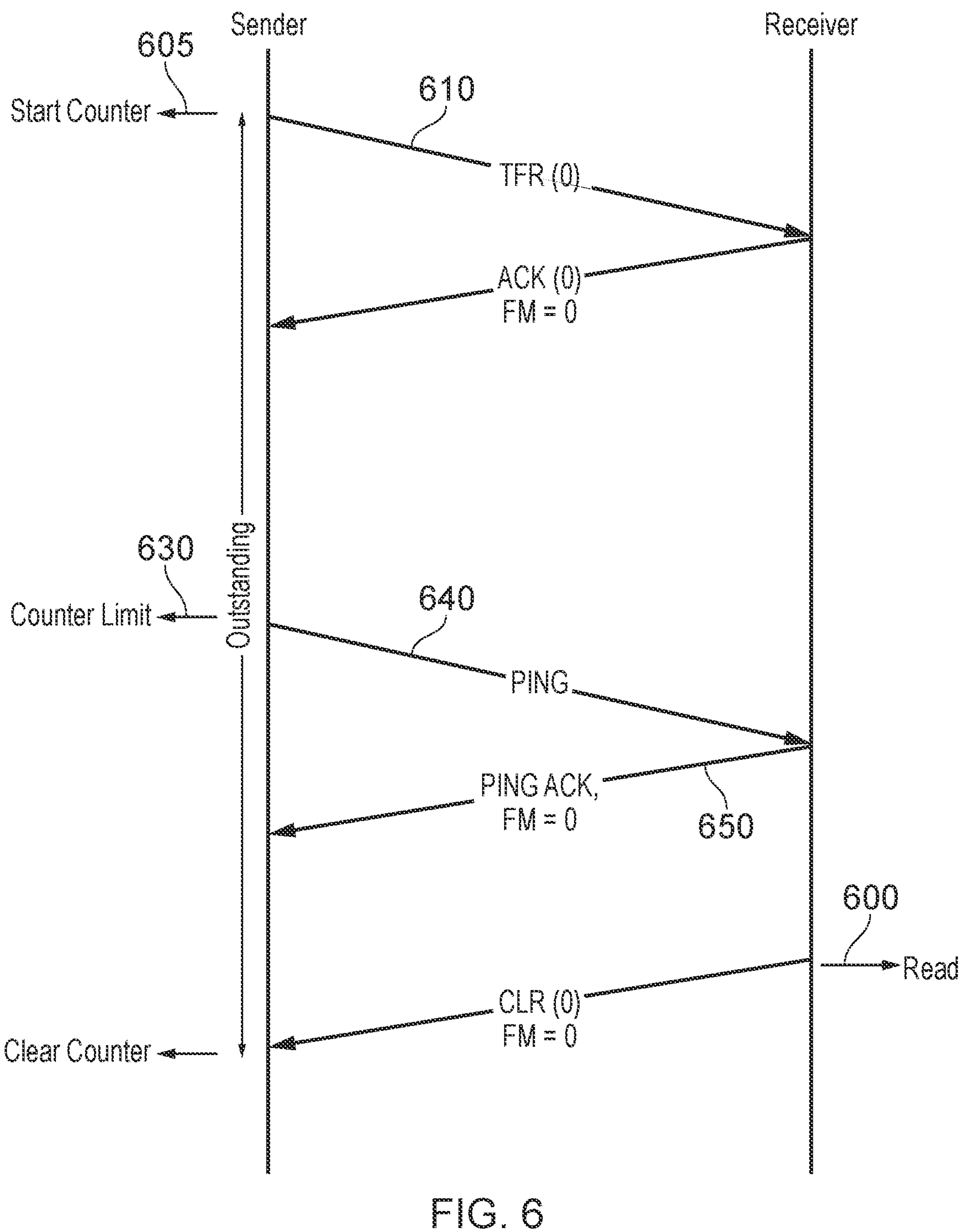
Figure 7:
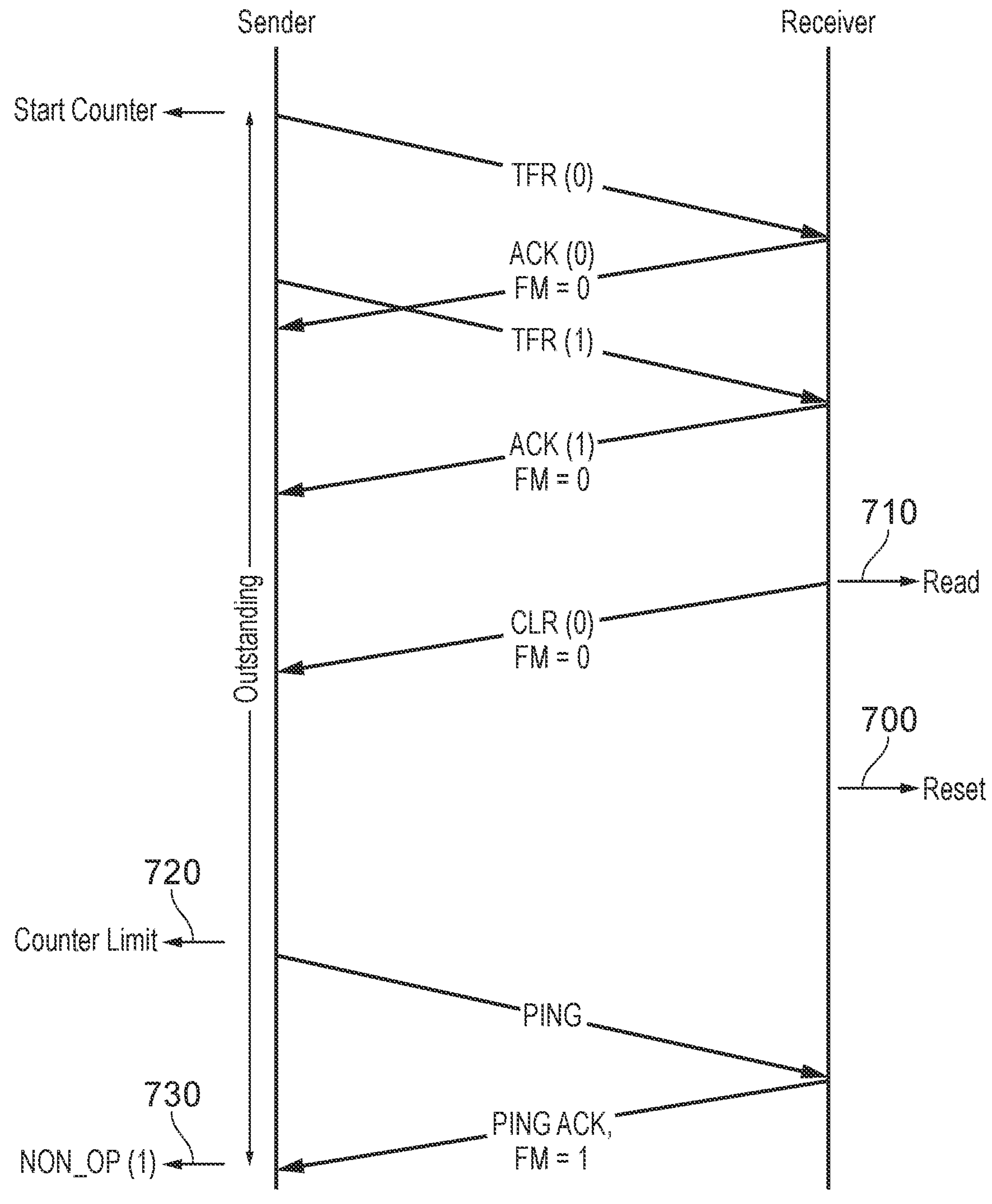
Figure 8:
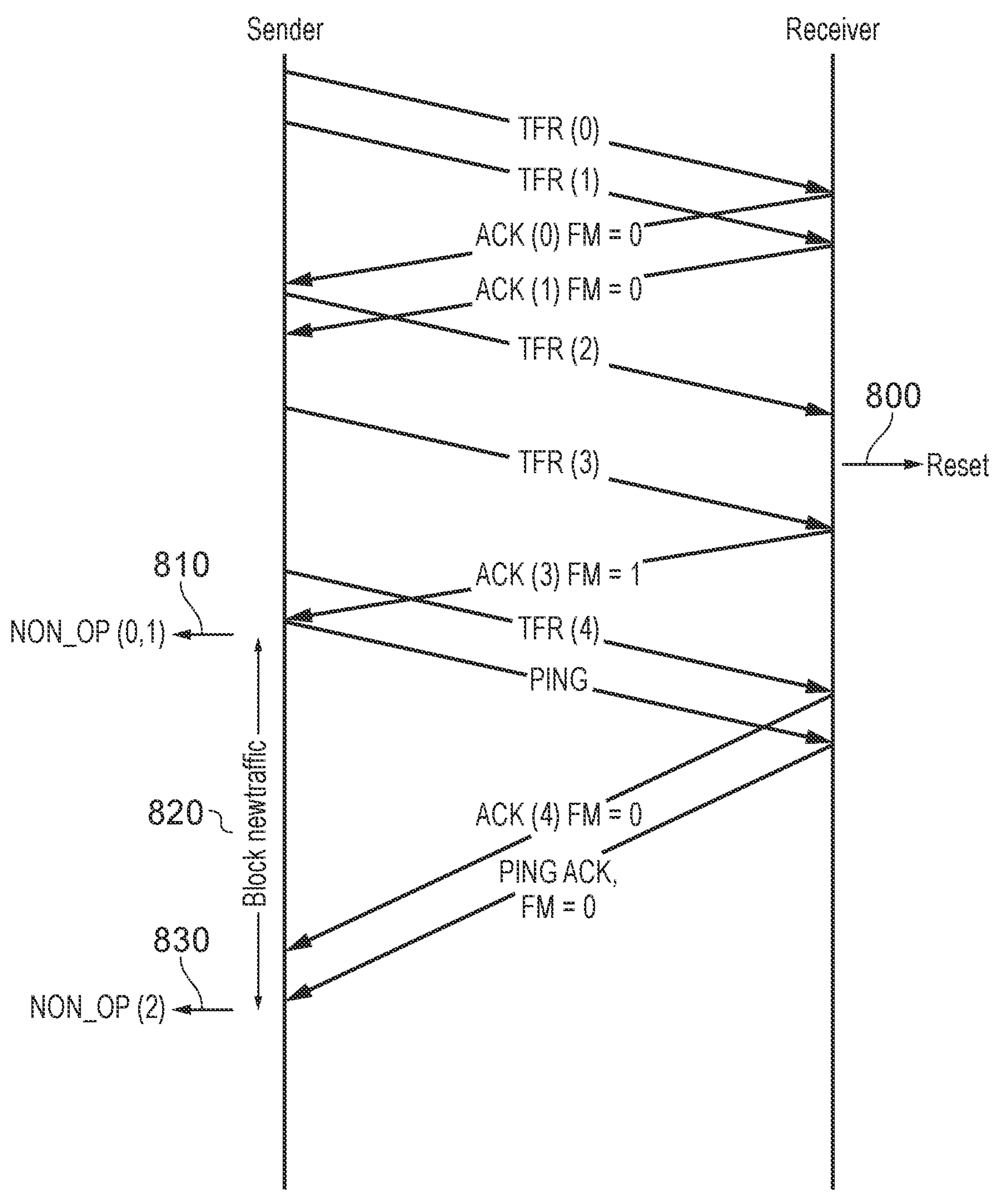

FIGS. 6 to 8 schematically illustrate respective variations of this basic process, while following the same fundamental timeline notation established in respect of FIG. 5 and described above.

FIG. 6 concerns an example situation in which a message transfer (in this example, TFR(0)) is acknowledged (ACK (0)) but then remains outstanding for a long period. Here, as used above, the reference to "outstanding" indicates that although the message transfer has been acknowledged, a read operation 600 has not yet taken place and been itself acknowledged by a CLR control message.

At the sending circuitry, the control circuitry 440 establishes a counter or timer to represent the time for which a message transfer has been outstanding. In the example of FIG. 6, the counter or timer is shown as starting 605 when the TFR(0) control message 610 is sent, though in other examples it could be started upon receipt of the respective ACK(0) control message 620. The counter or timer value is compared by the control circuitry 440 with a limit or threshold value, for example periodically, in order to detect when a time period or number of clock cycles represented by the counter or timer value has exceeded a threshold time period or number of clock cycles. For example, the counter or timer could count upwards, for example from 0, such that the comparison described above would be a detection of whether the counter or timer value is greater than or equal to a positive threshold value. Of course, the counter or timer could count downwards, for example towards a threshold value of 0, or other examples equivalent in effect to these operations could be used.

Whichever polarity of counting or timing is used, a point 630 may be reached at which the counter or timer has reached the limit or threshold value. At this point, the control circuitry 440 initiate a query by sending a control message to the receiving circuitry. The query does not relate to whether the transfer message TFR(0) has been received, because that has already been acknowledged by the ACK(0) control message 620. Instead, the query is simply a ping message PING 640 sent to the receiving circuitry to enquire whether the receiving circuitry is still in operation and in communication. In other words, the PING message, unlike other control messages described so far, does not relate to a particular channel.

Assuming that the receiving circuitry is still in operation and in communication, the control circuitry 495 of the receiving circuitry sends a ping acknowledgement PING ACK control message 650 to the sending circuitry.

In response to the ping acknowledgement, the sending circuitry may, for example, simply continue to wait for the outstanding payload message to be read, or may restart the counter or timer, or may establish a further threshold value so as to prompt similar operations after another period of time, or may simply cease operation of the counter or timer. In the example shown in FIG. 6, the counter or timer operation continues without the establishment of a further threshold value but it will be appreciated that any of these options may be employed.

Note that the PING ACK control message 650 is associated with an indication FM=0 (where FM represents "First Message") in the example of FIG. 6. The FM indication provides a representation of whether this is the first control message sent by the receiving circuitry since a reset operation was performed at the receiving circuitry. In the example notation used here, FM=0 implies that this is not the first control message sent by the receiving circuitry since a reset operation, whereas FM=1 implies that this is the first control message sent by the receiving circuitry since a reset operation at the receiving circuitry. The FM information may be encoded within the respective control message as a flag or the like, such as a one-bit flag or data field within a PING ACK or other message, or may be carried by a separate communication channel. In the present example, a one-bit flag within each control message is used, so that it is possible to encode an indication of FM=1 within any control message (or at least within a selection of possible control messages) sent by the receiving circuitry to the sending circuitry.

The potential relevance of a control message being a first control message since a reset operation at the receiving circuitry will now be discussed.

As discussed above, the MHU provides for uni-directional communication from an upstream device to a downstream device using sending circuitry associated with the upstream device and receiving circuitry associated with the downstream device. In a practical implementation the upstream device and the downstream device could be situated relatively far apart in an SoC or NoC arrangement. This type of architecture allows for the receiving circuitry to be reset, for example by respective domain control circuitry 105, 115, for example as a response to a system deadlock or a security issue. This in turn could in principle allow for message transfers to be lost at the receiving circuitry. Although one example implementation could provide for detection of such issues by using asynchronous connections or wires rooted across both sides (sending/receiving) of the MHU so that each side can detect a reset of the other side, this approach could become impractical with distributed or cross-chip systems such as those discussed above in which the sending circuitry and the receiving circuitry could be placed relatively far apart.

Therefore, the example approach discussed in the present disclosure is to provide a first message (FM) indication associated with (for example, forming a data field within) some or all of the control messages sent from the receiving circuitry to the sending circuitry. The FM indication indicates, as mentioned above, whether this is the first control message sent from the receiving circuitry to the sending circuitry since the receiving circuitry was reset. At the sending circuitry side, the respective control circuitry 440 tracks all channels that have transfers for which no acknowledgement ACK has yet been received as well as channels with outstanding unread data, or in other words instances in which the relevant CLR control message has not yet been received. On receiving a control message with the FM indication set (to indicate the first control message since reset) the sending circuitry can take action such as reporting those channels with unread data as non-operational.

This approach can potentially avoid issues which could occur if all of the tracking of resets and their effect upon outstanding payload messages were done at the receiving circuitry side, in that the receiving circuitry would need to communicate proactively to the sending circuitry and wake up the sending circuitry leading to a potential increase in power consumption.

PING is a further example of a sender control message. PING ACK is a further example of a receiver control message.

As discussed, FIG. 6 schematically illustrates an example in which FM=0. A further example will now be described with reference to FIG. 7 in which a reset operation 700 does take place at the receiving circuitry.

Referring to FIG. 7, two message transfer indications TFR(0) and TFR(1) for channels 0 and 1 respectively are acknowledged by ACK(0) and ACK(1). A read operation 710 takes place in respect of channel 0 and is acknowledged by CLR(0).

As discussed with reference to FIG. 6, the timer or counter was started at the initiation of TFR(0) and in this example reaches a counter limit at a time 720, at which point the sending circuitry issues a PING message which the receiving circuitry acknowledges with PING ACK.

However, following the read operation 710 but before the issue of the PING message, a reset operation 700 has been performed at the receiving circuitry. Therefore, the PING ACK control message has FM=1.

The fact that the FM indication shows that a reset has occurred at the receiving circuitry while the payload message corresponding to TFR(1) and ACK(1) was still unread can indicate that the payload message in channel 1 has potentially been lost.

In response to the control circuitry 440 of the sending circuitry detecting the FM=1 indication, the control circuitry 440 can take various actions. In principle, the control circuitry 440 could itself initiate the resending of the outstanding payload message for channel 1, assuming that a copy has been buffered at the sending circuitry. In other words, in response to indication of the reset (or missing message) condition, the circuitry may be configured to perform one or more functions selected from the list consisting of: (i) resend one or more payload messages (for example when no CLR response was returned); and (ii) report a missing message condition to the upstream circuitry. However, in the present examples, the sending circuitry simply reports the non-operational or missing message status of channel 1 to the relevant upstream device(s) by a control message NON_OP (1) 730.

A further example timeline will now be described with reference to FIG. 8. Once again, a reset operation 800 is illustrated.

Before the reset operation, three transfer control messages arrive at the receiving circuitry from the sending circuitry, namely TFR(0), TFR(1) and TFR(2). Of these, two are acknowledged by ACK(0) and ACK(1). However, an acknowledgement for TFR(2) does not reach the sending circuitry because of the reset operation 800 which takes place. Therefore, in the example shown, TFR(2) is unacknowledged.

After the reset operation 800, two further transfer control messages TFR(3) and TFR(4) arrive at the receiving circuitry. (Note that in the example as drawn, TFR(3) originated before the reset operation 800 occurred at the receiver but arrives at the receiver after the reset has occurred). The control message TFR(3) is acknowledged by ACK(3) which, being the first control message sent by the receiving circuitry since the reset operation 800, has FM=1. The control message TFR(4) is acknowledged by ACK(4) which is not the first message since reset and so has FM=0.

In response to the FM=1 indication associated with ACK (3), the sending circuitry indicates that channels 0 and 1 are non-operational by a NON_OP(0,1) message 810. The generation of this message follows the same analysis by the control circuitry 440 of the sending circuitry as described with reference to FIG. 7, namely that a control message indicating FM=1 has been received while both of channels 0 and 1 have outstanding unread payload messages.

In terms of dealing with transfer control messages such as TFR(2) where no acknowledgement was received, a further example mechanism will now be described which makes use of the ping technique described above. In particular, in response to receipt of a message for which FM=1, the sending circuitry issues a PING control message and also blocks 820 or prevents further transfers from being initiated until the ping request has been resolved.

When the ping acknowledgement PING ACK (which in the present example would have FM=0) is received, the sending circuitry knows that (a) a first control message has been received since reset of the receiving circuitry—in this example, ACK(3)—and (b) the receiving circuitry has responded with a ping acknowledgement showing that it is capable of sending further messages but an acknowledgement for TFR(2) has not arrived. Therefore, the sending circuitry can flag channel 2 as non-operational by a message 830.

Note that TFR(4) was issued before the ACK(3) control message was received by the sending circuitry and that in the example shown it is acknowledged by ACK(4) before the ping response is received by the sending circuitry. Therefore, channel 4 does not need to be flagged as non-operational.

At the stage that the sending circuitry issues the control message 830 to the relevant upstream device(s), all outstanding unread payload messages have been dealt with. In particular, TFR(4) has been acknowledged; TFR(0) and TFR(1), though acknowledged before the reset operation, were unread at the time of the reset and so those channels are marked as non-operational; and TFR(2) which was unacknowledged at the time of the reset is not now going to be acknowledged by the receiving circuitry because a ping response PING_ACK has been received while the sending circuitry was waiting for that acknowledgement. Therefore, channel 2 is also marked as non-operational.

The temporary blockage 820 on new traffic can be lifted when the further non-operational notification is sent in response to the ping acknowledgement, because by then—and since the reset operation—all of the outstanding transfers have either been acknowledged (in the case of TFR(4)) or detected not to be acknowledged.

Therefore, as described, on receiving a control message with the FM indication set to indicate that this is the first control message since a reset at the receiver side, the control circuitry 440 of the sending circuitry can immediately report any channels with currently unread (though previously acknowledged) transfers as non-operational. Then, by sending a ping message, any outstanding but not lost transfer acknowledgements should be received at the sending circuitry before the ping acknowledgement. To ensure that new request do not interfere with the determination of which channels have lost data, all other requests are stalled or blocked from the sending circuitry while the ping request is outstanding. Once the ping acknowledgement arrives, it is known that there are no further acknowledgements still to arrive and those relevant channels can also be marked as non-operational.

In summary, in response to detection of an indication indicating that the given control message is a first control message sent by the message receiver circuitry to the message sender circuitry after a reset of circuitry in the receiver, the control circuitry 440 may be configured to detect one or both of: any payload messages (such as that indicated by TFR(2) in FIG. 8) for which the message receiver circuitry has not yet acknowledged receipt, and any payload messages (such as TFR(0) and TFR(1) in FIG. 8) for which the message receiver circuitry has not yet acknowledged output to downstream circuitry. The control circuitry 440 may be configured to indicate a missing message condition in response to a detection of any payload messages for which the message receiver circuitry has not yet acknowledged output to downstream circuitry following detection of the indication (ACK(3) FM=1 in FIG. 8) indicating that the given control message is a first control message sent by the message receiver circuitry to the message sender circuitry after a reset of circuitry in the receiver. Similarly, when the control circuitry detects one or more payload messages for which the message receiver circuitry has not yet acknowledged receipt following detection of the indication indicating that the given control message is a first control message sent by the message receiver circuitry to the message sender circuitry after a reset of circuitry in the receiver, the control circuitry may be configured to request the message receiver circuitry to acknowledge receipt of those one or more payload messages (by sending a PING message for example).

In the meantime, the control circuitry may be configured to inhibit 820 the message sender circuitry from sending any further payload messages until the message receiver circuitry has responded to the request.

As discussed in connection with FIGS. 6 and 7 for example (and as a technique which could also be used with FIG. 8), the control circuitry may comprise timer circuitry 445 to detect when a period in which at least one payload message has not yet been acknowledged as having been output to downstream circuitry exceeds a threshold period and, in response to such a detection, to request the message receiver circuitry to indicate ongoing operation of the message receiver circuitry and to acknowledge receipt of any payload messages for which acknowledgement of receipt has not yet been provided. In examples the control circuitry may be configured to indicate a missing message condition in response to a detection of any payload messages for which the message receiver circuitry has not yet acknowledged receipt in response to the (ping) request.

In other examples (instead of or in addition to aspects discussed above) the timer circuitry 445 may establish a timer when a PING message (as an example of a control message) is sent. In the situation that a threshold period expires (which threshold period may be different to or the same as that discussed above in connection with payload message) without a PING_ACK control message having been received back, a reset and/or missing message condition (for any payload messages for which an acknowledgement had not been received, leading to the issue of the PING message) may be inferred by the control circuitry and the actions described above may be taken. In other words, when the control circuitry receives no response to the request for at least a threshold time period, the control circuitry is configured to indicate a missing message condition in response to a detection of any payload messages for which the message receiver circuitry has not yet acknowledged receipt.

Apparatus Example

FIG. 4*b* therefore provides an example of circuitry comprising:

- a receiver 210 comprising message receiver circuitry 490, 495 to receive payload messages and control messages from message sender circuitry, the message receiver circuitry comprising:
- communication circuitry 470, 490 to send control messages to the message sender circuitry, the control messages relating to actions by the message receiver circuitry in response to payload messages or control messages from the message sender circuitry;
- in which the communication circuitry is configured to selectively associate a respective indication with at least some of the control messages sent to the message sender circuitry, the indication indicating whether a given control message with which the indication is associated is a first control message sent by the communication circuitry to the message sender circuitry after a reset of circuitry in the receiver.

FIG. 4*a* provides an example of circuitry comprising:

- message sender circuitry 200 to send payload messages and control messages to message receiver circuitry of a receiver and to receive control messages from the message receiver circuitry, the message sender circuitry comprising:
- control circuitry 440 to detect an indication, associated with a given control message received from the message receiver circuitry, the indication indicating whether the given control message is a first control message sent by the message receiver circuitry to the message sender circuitry after a reset of circuitry in the receiver.

Considering the two sides of the arrangement together, FIG. 2 therefore provides an example of apparatus comprising:

receiving circuitry as defined above connected for communication with downstream circuitry 160 in a first operational domain 110; and sending circuitry as defined above, connected for communication with upstream circuitry 120 in a second operational domain 100 different to the first operational domain.

Method Examples

Figures 9, 10:
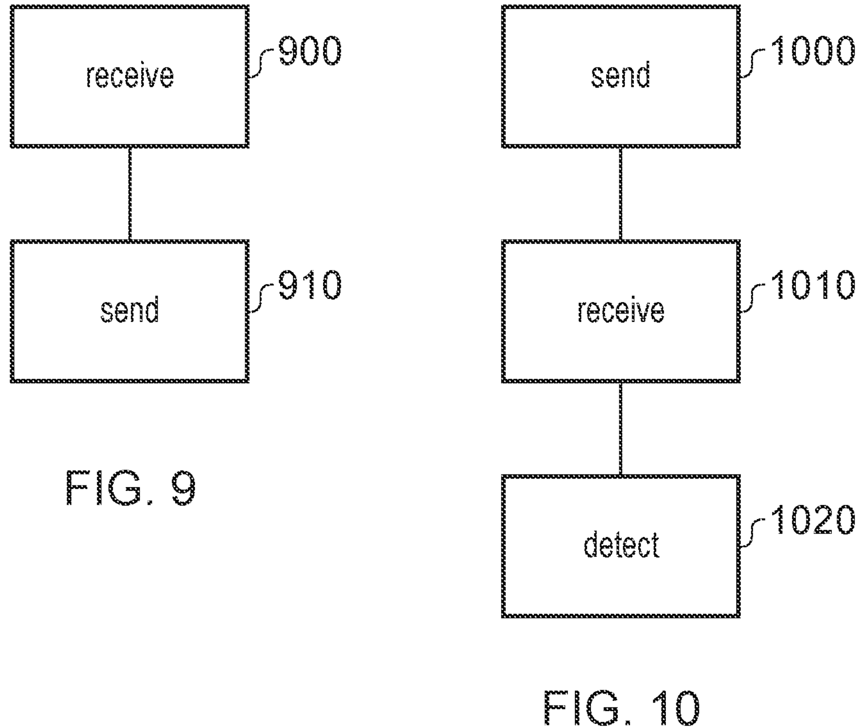
FIGS. 9 and 10 are schematic flowcharts illustrating respective methods.

FIG. 9 is a schematic flowchart illustrating a method comprising:

message receiver circuitry of a receiver receiving (at a step 900) payload messages and sender control messages from message sender circuitry; and sending (at a step 910) receiver control messages to the message sender circuitry, the receiver control messages relating to actions by the message receiver circuitry in response to payload messages or sender control messages from the message sender circuitry;

in which the sending step comprises selectively associating a respective indication with at least some of the receiver control messages sent to the message sender circuitry, the indication indicating whether a given receiver control message with which the indication is associated is a first receiver control message sent by the communication circuitry to the message sender circuitry after a reset of circuitry in the receiver.

FIG. 10 is a schematic flowchart illustrating a method comprising:

sending (at a step 1000) payload messages and sender control messages to message receiver circuitry of a receiver;

receiving (at a step 1010) receiver control messages from the message receiver circuitry; and detecting (at a step 1020) an indication, associated with a given receiver control message received from the message receiver circuitry, the indication indicating whether the given receiver control message is a first receiver control message sent by the message receiver circuitry to the message sender circuitry after a reset of circuitry in the receiver.

Either of these processes, or at least respective aspects of them, could be implemented by a programmable processor executing appropriate program instructions which, when executed by the programmable processor, cause the programmable processor to perform the method of FIG. 9 and/or the method of FIG. 10.

It will be appreciated that such program instructions, or a non-transitory machine-readable medium storing such instructions, are considered to represent embodiments of the present disclosure.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Message handling unit (MHU) circuitry to provide a bridge between first and second operational domains which are configured to have a respective clock, power and/or reset resource removed or applied independently of the other of the first and second operational domains, the MHU circuitry comprising:

a receiver comprising message receiver circuitry of the first operational domain configured to receive payload messages and sender control messages from message sender circuitry of the second operational domain, in which the sender control messages are received via domain bridge circuitry and the payload messages are retrieved from buffer circuitry, the buffer circuitry providing a shared payload message area accessible by the message receiver circuitry of the first operational domain and the message sender circuitry of the second operational domain, the message receiver circuitry comprising:

communication circuitry configured to send receiver control messages to the message sender circuitry via the domain bridge circuitry, the receiver control messages relating to actions by the message receiver circuitry in response to payload messages or sender control messages from the message sender circuitry;

in which the communication circuitry is configured to selectively associate a respective indication with at least some of the receiver control messages sent to the message sender circuitry, the indication indicating whether a given receiver control message with which the indication is associated is a first receiver control message sent by the communication circuitry to the message sender circuitry after a reset of circuitry in the receiver.

2. The MHU circuitry of claim 1, in which the communication circuitry is configured to encode the indication within the given receiver control message.

3. The MHU circuitry of claim 1, in which the receiver control messages comprise messages selected from the list consisting of: (i) a message to acknowledge receipt of a payload message or a sender control message from the message sender circuitry and (ii) a message to acknowledge output of a payload message by the message receiver circuitry to downstream circuitry.

4. The MHU circuitry of claim 3, in which the buffer circuitry is accessible by the downstream circuitry, to buffer payload messages received from the message sender circuitry.

5. The MHU circuitry of claim 4, in which the buffer circuitry comprises a first-in-first-out buffer.

6. Message handling unit (MHU) circuitry to provide a bridge between first and second operational domains which are configured to have a respective clock, power and/or reset resource removed or applied independently of the other of the first and second operational domains, the MHU circuitry comprising:

message sender circuitry of the second operational domain configured to send payload messages and sender control messages to message receiver circuitry of a receiver of the first operational domain, in which the sender control messages are sent via domain bridge circuitry and the payload messages are written to buffer circuitry, the buffer circuitry providing a shared payload message area accessible by the message receiver circuitry of the first operational domain and the message sender circuitry of the second operational domain, and to receive receiver control messages from the message receiver circuitry via domain bridge circuitry, the message sender circuitry comprising:

control circuitry configured to detect an indication, associated with a given receiver control message received from the message receiver circuitry, the indication indicating whether the given receiver control message is a first receiver control message sent by the message receiver circuitry to the message sender circuitry after a reset of circuitry in the receiver.

7. The MHU circuitry of claim 6, in which the message sender circuitry is configured to receive receiver control messages from the message receiver circuitry selected from the list consisting of: (i) a message to acknowledge receipt of a payload message or a sender control message from the message sender circuitry and messages to acknowledge output of a payload message by the message receiver circuitry to downstream circuitry.

8. The MHU circuitry of claim 7, in which in response to detection of an indication indicating that the given receiver control message is a first control message sent by the message receiver circuitry to the message sender circuitry after a reset of circuitry in the receiver, the control circuitry is configured to detect one or both of: any payload messages for which the message receiver circuitry has not yet acknowledged receipt, and any payload messages for which the message receiver circuitry has not yet acknowledged output to downstream circuitry.

9. The MHU circuitry of claim 8, in which the control circuitry is configured to indicate a missing message condition in response to a detection of any payload messages for which the message receiver circuitry has not yet acknowledged output to downstream circuitry following detection of the indication indicating that the given receiver control message is a first receiver control message sent by the message receiver circuitry to the message sender circuitry after a reset of circuitry in the receiver.

10. The MHU circuitry of claim 8, in which when the control circuitry detects one or more payload messages for which the message receiver circuitry has not yet acknowledged receipt following detection of the indication indicating that the given control message is a first receiver control message sent by the message receiver circuitry to the message sender circuitry after a reset of circuitry in the receiver, the control circuitry is configured to request the message receiver circuitry to acknowledge receipt of those one or more payload messages.

11. The MHU circuitry of claim 10, in which the control circuitry is configured to inhibit the message sender circuitry from sending any further payload messages until the message receiver circuitry has responded to the request.

12. The MHU circuitry of claim 8, in which the control circuitry comprises timer circuitry configured to detect when a period in which at least one payload message has not yet been acknowledged as having been output to downstream circuitry exceeds a threshold period and, in response to such a detection, to request the message receiver circuitry to indicate ongoing operation of the message receiver circuitry and to acknowledge receipt of any payload messages for which acknowledgement of receipt has not yet been provided.

13. The MHU circuitry of claim 10, in which, when the control circuitry receives no response to the request for at least a threshold time period, the control circuitry is configured to indicate a missing message condition in response to a detection of any payload messages for which the message receiver circuitry has not yet acknowledged receipt.

14. The MHU circuitry of claim 10, in which the control circuitry is configured to indicate a missing message condition in response to a detection of any payload messages for which the message receiver circuitry has not yet acknowledged receipt in response to the request.

15. The MHU circuitry of claim 9, in which, in response to indication of the missing message condition, the message sender circuitry is configured to perform one or more functions selected from the list consisting of:

(i) resend one or more payload messages; and (ii) report a missing message condition to the upstream circuitry.

16. Apparatus comprising:

the MHU circuitry of claim 1, connected for communication with downstream circuitry in a first operational domain; and message sender circuitry configured to send payload messages and sender control messages to message receiver circuitry of a receiver and to receive receiver control messages from the message receiver circuitry, the message sender circuitry comprising:

control circuitry configured to detect an indication, associated with a given receiver control message received from the message receiver circuitry, the indication indicating whether the given receiver control message is a first receiver control message sent by the message receiver circuitry to the message sender circuitry after a reset of circuitry in the receiver, wherein the message sender circuitry is connected for communication with upstream circuitry in a second operational domain different from the first operational domain.

17. The apparatus of claim 16, in which the control circuitry of the message receiver circuitry is configured to control a reset of circuitry in the receiver independently of ongoing operation of the message sender circuitry.

18. A method for providing a bridge between first and second operational domains which are configured to have a respective clock, power and/or reset resource removed or applied independently of the other of the first and second operational domains, comprising:

message receiver circuitry of a receiver of the first operational domain receiving payload messages and sender control messages from message sender circuitry of the second operational domain, in which the sender control messages are received via domain bridge circuitry and the payload messages are retrieved from buffer circuitry, the buffer circuitry providing a shared payload message area accessible by the message receiver circuitry of the first operational domain and the message sender circuitry of the second operational domain; and sending receiver control messages to the message sender circuitry via the domain bridge circuitry, the receiver control messages relating to actions by the message receiver circuitry in response to payload messages or sender control messages from the message sender circuitry;

in which the sending step comprises selectively associate a respective indication with at least some of the receiver control messages sent to the message sender circuitry, the indication indicating whether a given receiver control message with which the indication is associated is a first receiver control message sent by the communication circuitry to the message sender circuitry after a reset of circuitry in the receiver.

19. A method for providing a bridge between first and second operational domains which are configured to have a respective clock, power, and/or reset resource removed or applied independently of the other of the first and second operational domains, comprising:

sending payload messages and sender control messages to message receiver circuitry of a receiver of the first operational domain, in which the sender control messages are sent via domain bridge circuitry and the payload messages are written to buffer circuitry, the buffer circuitry providing a shared payload message area accessible by the message receiver circuitry of the first operational domain and the message sender circuitry of the second operational domain;

receiving receiver control messages from the message receiver circuitry via the domain bridge circuitry; and detecting an indication, associated with a given receiver control message received from the message receiver circuitry, the indication indicating whether the given receiver control message is a first receiver control message sent by the message receiver circuitry to the message sender circuitry after a reset of circuitry in the receiver.

* * * * *